United States Patent
Capelli et al.

(10) Patent No.: US 12,539,193 B2
(45) Date of Patent: Feb. 3, 2026

(54) MEDICAL IMAGING SYSTEM, DEFLECTION UNIT AND METHOD FOR CALIBRATING A MEDICAL IMAGING SYSTEM

(71) Applicant: BHS Technologies GmbH, Innsbruck (AT)

(72) Inventors: Mark Capelli, Innsbruck (AT); Michael Mair, Rum (AT); Michael Santek, Götzens (AT)

(73) Assignee: BHS Technologies GmbH, Innsbruck (AT)

( * ) Notice: Subject to any disclaimer, the term of this patent is extended or adjusted under 35 U.S.C. 154(b) by 740 days.

(21) Appl. No.: 17/699,187

(22) Filed: Mar. 21, 2022

(65) Prior Publication Data
US 2022/0296333 A1    Sep. 22, 2022

(30) Foreign Application Priority Data

Mar. 22, 2021    (EP) .................................... 21164039

(51) Int. Cl.
| | | |
|---|---|---|
| *A61B 90/00* | (2016.01) | |
| *A61B 90/20* | (2016.01) | |
| *G02B 21/18* | (2006.01) | |
| *G02B 21/24* | (2006.01) | |
| *G02B 26/10* | (2006.01) | |

(52) U.S. Cl.
CPC ............ *A61B 90/361* (2016.02); *A61B 90/20* (2016.02); *G02B 21/18* (2013.01); *G02B 21/24* (2013.01); *G02B 26/108* (2013.01); *A61B 2090/3618* (2016.02); *A61B 2560/0223* (2013.01)

(58) Field of Classification Search
CPC ....... A61B 90/361; A61B 90/20; A61B 90/30; A61B 90/50; A61B 90/00; A61B 1/00057; A61B 1/00101; A61B 1/00179; A61B 1/00183; A61B 1/00096; A61B 5/0071; A61B 5/0059; A61B 2090/3618; A61B 2560/0223; G02B 21/18; G02B 21/24; G02B 21/0012; G02B 21/02; G02B 21/06; G02B 21/365; G02B 21/361; G02B 21/367; G02B 26/10; G02B 26/108; G02C 7/08; G02C 7/086; G02C 2200/02
USPC ............... 359/368, 481, 275, 358, 802, 826; 351/41, 155, 205, 206, 210, 221
See application file for complete search history.

(56) References Cited

U.S. PATENT DOCUMENTS

| | | |
|---|---|---|
| 6,537,209 B1 | 3/2003 | Pinkhasik et al. |
| 9,848,773 B2 | 12/2017 | Su |
| 10,779,729 B2 | 9/2020 | Suzuki et al. |

(Continued)

OTHER PUBLICATIONS

Communication Pursuant to Article 94(3) EPC Dated Oct. 24, 2025 From the European Patent Office Re. Application No. 21164039.6. (8 Pages).

(Continued)

*Primary Examiner* — Jie Lei

(57) ABSTRACT

The present invention relates to a medical imaging system (1) for imaging an object, comprising an imaging unit (10) comprising at least one imaging device (11) and a deflection unit (20) comprising at least one imaging deflection member (21*a*), wherein the at least one imaging deflection member (21*a*) is configured to be selectively disposed in an optical path of the imaging device (11) to selectively deflect an imaging beam.

16 Claims, 2 Drawing Sheets

(56) References Cited

U.S. PATENT DOCUMENTS

| | | | |
|---|---|---|---|
| 2002/0103420 A1 | 8/2002 | Coleman et al. | |
| 2005/0152029 A1* | 7/2005 | Endo | G02B 21/16 |
| | | | 359/383 |
| 2005/0182321 A1* | 8/2005 | Frangioni | A61B 5/0071 |
| | | | 600/431 |
| 2008/0304143 A1 | 12/2008 | Jacobsen et al. | |
| 2010/0118269 A1 | 5/2010 | Shea et al. | |
| 2014/0009825 A1 | 1/2014 | Luecke et al. | |
| 2014/0346332 A1 | 11/2014 | Honda | |
| 2016/0035079 A1 | 2/2016 | Tenney et al. | |
| 2019/0247677 A1 | 8/2019 | Mead et al. | |

OTHER PUBLICATIONS

Cordero "Understanding Your Operating Microscope's Assistant Scope and Beamsplitter", Community Eye Health Journal, XP093326365, Poster, 27(86): 37, 2014.

Communication Pursuant to Article 94(3) EPC Dated Nov. 20, 2025 From the European Patent Office Re. Application No. 21164039.6. (10 Pages).

* cited by examiner

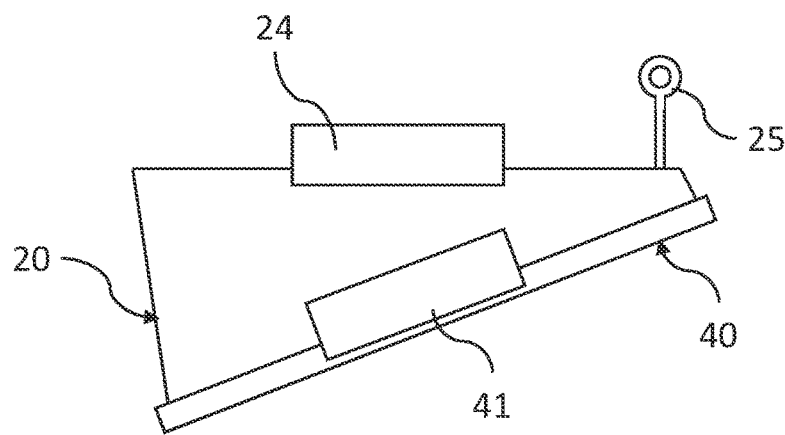
Fig. 3
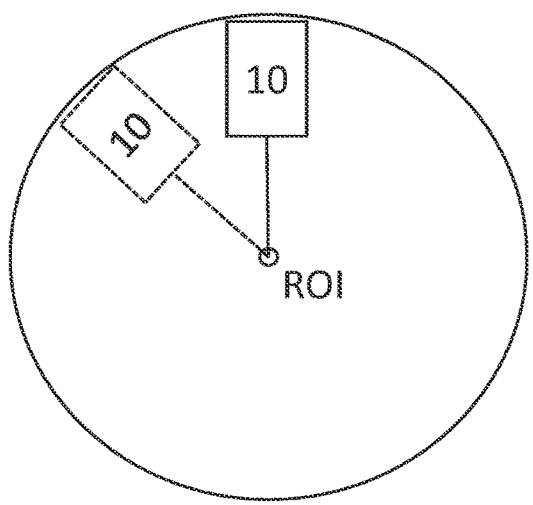 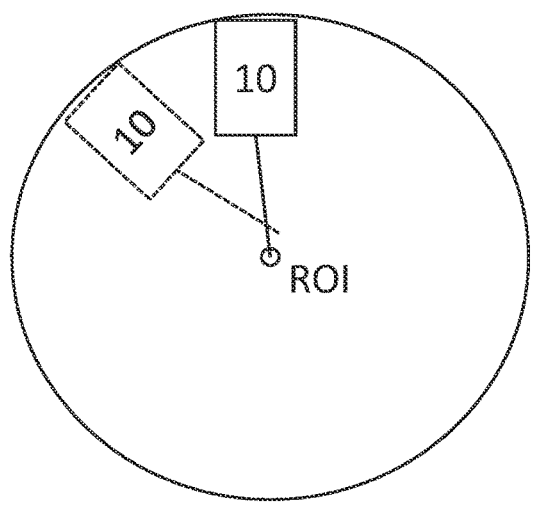
Fig. 4A          Fig. 4B

MEDICAL IMAGING SYSTEM, DEFLECTION UNIT AND METHOD FOR CALIBRATING A MEDICAL IMAGING SYSTEM

RELATED APPLICATION

This application claims the benefit of priority of European Patent Application No. 21164039.6 filed on Mar. 22, 2021, the contents of which are incorporated herein by reference in their entirety.

FIELD AND BACKGROUND OF THE INVENTION

The present invention relates to a medical imaging system for imaging an object, a deflection unit for such medical imaging system and a method for calibrating a medical imaging system.

Medical imaging systems, like robotic medical microscopes, are used to image an object such as a situs. Some of the imaging procedures require a horizontal or at least strongly inclined viewing angle. The imaging unit of an imaging system is accordingly inclined, wherein the inclination angle may be limited by the respective handling system. Further, the inclined imaging unit restricts the freedom of movement of the imaging system as well as the freedom of movement of a surgeon or other medical staff member. In other words, the imaging unit of an imaging system may become an obstacle during medical procedures depending on an inclination angle with reference to a vertical orientation.

SUMMARY OF THE INVENTION

Accordingly, it is an object of the present invention to provide an imaging system for imaging an object, a deflection unit for such medical imaging system and a method for calibrating a medical imaging system with enhanced flexibility.

The object is solved by an imaging device for a medical imaging system according to claim 1, a deflection unit according to claim 8, and a method for calibrating a medical imaging system according to claim 14. Further aspects of the present invention are subject of the dependent claims.

According to one aspect of the present invention, a medical imaging system for imaging an object comprises an imaging unit comprising at least one imaging device and a deflection unit comprising at least one imaging deflection member. The at least one imaging deflection member is configured to be selectively disposed in an optical path of the imaging device to selectively deflect an imaging beam.

Due to the imaging deflection member being configured to be selectively disposed in an optical path of the imaging device to selectively deflect an imaging beam, the imaging device may be capable of providing an inclined or horizontal view without being inclined with respect to a vertical position or an upright position with reference to the vertical position. Consequently, the flexibility in an imaging angle may be enhanced and positions that may interfere with an access area for medical procedures may be reduced.

To selectively dispose the imaging deflection member in the optical path of the imaging device, the imaging deflection member may be configured to be moveable with respect to the deflection unit and/or the deflection unit may configured to be movable with respect to the imaging unit. In other words, the imaging deflection member and/or the deflection unit are configured to be selectively disposed in an optical path of the imaging device.

In some embodiments, the deflection unit is at least partially releasably attachable to an imaging side of the imaging unit.

The imaging side of the imaging unit corresponds to the side of the imaging unit comprising the imaging portion of the imaging device. The imaging portion of the imaging device comprises the inlet for an optical beam to be imaged by the imaging device.

The term "at least partially" relates to configurations of the imaging system, wherein at least one portion of the deflection unit remains attached to the imaging unit when another portion of the deflection unit is released or detached, respectively. For example, the one portion is affixed to the imaging device by a hinged joint with the other portion being attachable to and detachable from the imaging unit. Accordingly, such deflection unit is configured to be affixed to the imaging unit and to be pivotable around the hinged joint. The deflection unit may be selectively disposed in the optical path of the imaging device when the other portion is attached to the imaging device, and the deflection unit may be moved out of the optical path when the other portion is detached and the deflection unit is pivoted around the hinge joint, or vice versa.

Alternatively, the entire deflection unit may be releasably attachable to an imaging side of the imaging unit. Accordingly, the imaging system may be used without the deflection unit, e.g. for applications requiring a mainly vertical or upright position of the imaging unit. Due to the deflection unit being entirely detachable, the deflection unit does not provide an additional potentially interfering contour when detached. Consequently, the freedom of movement in vertical or mainly upright configurations may be enhanced, for example, by increasing the ability of the imaging unit to approach an object to be imaged. In other words, the deflection unit may be used on demand as accessory of the imaging system.

According to some embodiments, the deflection unit comprises at least one attachment member, preferably configured as a snap-fit member, attachable to a corresponding receiving portion of the imaging unit.

The at least one attachment member allows the at least partially releasable attachment of the deflection unit to the imaging unit. For example, two snap-fit members extending laterally from an attachment side of the deflection unit facing the imaging side of the imaging unit in a direction to the imaging side may be used as attachment members. The snap-fit portions of the snap fit members are configured to engage respective receiving portions of the imaging unit. Alternatively, the attachment member may be provided by an internal or external thread portion to be screwed on or in a corresponding external or internal thread portion of the imaging unit.

In some embodiments, the deflection unit comprises at least one locking member to lock a connection of the deflection unit and the imaging unit.

For example, the deflection unit may provide an extension extending laterally from the attachment side of the deflection unit in a direction of the imaging side of the imaging unit with at least one eyelet at a free end thereof. The deflection unit may thereby be locked to the imaging unit by a splint pin guided through the at least one eyelet and a corresponding receiving portion or corresponding receiving portions provided by the imaging unit, e.g. further eyelets of the imaging unit.

The locking member may lock the attachment of the deflection unit to the imaging unit against an unintended detachment. Further, the locking member may be configured to function as a hinge joint as described above.

According to some embodiments, the medical imaging system further comprises a cover releasably attachable to a side of the deflection unit to be opposed to the imaging side of the imaging unit.

For example, a sterile cover may be releasable attachable to deflection unit, e.g. by snap-fit members of the cover configured to engage corresponding receiving portions of the deflection member, or vice versa.

In some embodiments, the medical imaging system further comprises at least one light source separate from the imaging device, and a light emitted from the at least one light source is deflectable by the at least one imaging deflection member and/or at least one separate light deflection member of the deflection unit.

The at least one light source allows further illumination of an object to be imaged. Alternatively or in addition, the light source or a further light source may be used to emit an excitation wavelength of fluorescence imaging. The at least one light source may be configured to emit light form the imaging side of the imaging unit. Further the at least one light source may be configured to emit the light along an optical path parallel to the optical path of the beam received by the imaging devices.

With the light emitted by the at least one light source being offset from the optical path of the imaging unit, the light of the at least one light source may be deflected at a portion of the imaging deflection member different from the deflection portion for the optical path of the imaging device, when using the imaging deflection member for all deflections. Alternatively, the at least one light source may be configured to emit the light on the same deflection portion as for the optical path of the imaging device. In such event, the incidence angles and deflection angles of the light of the at least one light source and the optical path of the imaging device differ from each other.

Alternatively or in addition, the light emitted by the at least one light source may be deflected by a separate light deflection member. Consequently, an interference of the light of the at least one light source with the optical path of the imaging device may be avoided and/or the flexibility of the imaging system with respect to different deflection options may be enhanced. In particular, the separated light deflection elements may cause the light to be deflected differently from the deflection of the optical path of the imaging device. For example, the deflection members are differently inclined with respect to each other. Consequently, the deflection of the light of the at least one light source may be adapted to predetermined illumination concepts, e.g. direct to indirect illumination of an object to be imaged by the imaging device.

According to some embodiments, the medical imaging system further comprises a control unit to adjust a deflection angle of the at least one imaging deflection member and/or the at least one separate light deflection member.

Such control unit may be incorporated in the imaging unit. Alternatively, the control unit may be incorporated in the deflection unit or forming part of an external control device.

With respect to an adjustment of the deflection members based on a control signal by the control unit, the imaging deflection member and/or the at least one separate light deflection member are/is configured to be movable by a corresponding drive or corresponding drives. Thus, the flexibility of the imaging system may be enhanced. For example, different imaging and/or lighting angles may be provided with reference to one position of the lighting unit. Further, the ability of moving the imaging unit in different positions, e.g. for ergonomic reasons or individual preferences of an operator, is increased while still being able to image and/or illuminate an object.

Even though the imaging deflection member and/or the at least one separate light deflection member may also be configured to be—alternatively or in addition—movable manually, reproducibility of a predetermined deflection angle is enhanced by an electronically controlled adaption.

A further aspect of the present invention relates to a deflection unit for a medical imaging system as described above, wherein the at least one imaging deflection member and/or the at least one separate light deflection member is a deflection mirror or a deflection prism.

Deflection mirrors or deflection prisms provide a high availability as well as an ease and comparably robust implementation. However, other optical refraction or diffraction elements may be considered as deflection members, e.g. optical elements with diffraction gratings or the like.

In some embodiments, the at least one imaging deflection member and/or the at least one separate light deflection member is a wavelength-selective deflection member.

For example, the imaging deflection member may be configured to deflect only a predetermined wavelength or wavelength range to the imaging device to be received thereby. This may be advantageous for imaging fluorescence images with the wavelength deflected to the imaging device in the range of the fluorescence light. Alternatively, the wavelength-selective deflection member may only deflect wavelengths to the imaging device that correspond to predetermined colors. The wavelength-selection by the wavelength-selective deflection member may be based on deflecting only a predetermined wavelength and transmitting others and/or deflecting predetermined wavelengths within a deflection angle range to be received by the imaging device while other wavelengths are deflected outside a deflection angle range to be received by the imaging device.

Similarly, the at least one light deflection member may be configured to only deflect wavelengths in a predetermined range to an object or other defined location while others are absorbed, transmitted or deflected elsewhere. For example, the at least one light deflection member may be configured to deflect excitation light to the object for fluorescence excitation while other light is absorbed to reduce further illumination. In other words, the deflection member may also be considered as beam splitter with a deflection ratio for a predetermined light portion.

According to some embodiments, a deflection angle and/or the wavelength-selectivity of the at least one imaging deflection member and/or the at least one separate light deflection member are/is configured to be adjustable.

Due to a capability of adjusting the deflection angle the at least one imaging deflection member and/or the at least one separate light deflection member of the optical path of the imaging device and/or the illumination location of the at least one light source may be adjusted with the requirement of moving the imaging unit. Such capability may be implemented by a drive or a plurality of drives to move, e.g. tilt, the at least one imaging deflection member and/or the at least one separate light deflection member in order to change a deflection angle thereof accordingly.

Further, due to a capability of adjusting the wavelength-selectivity of the at least one imaging deflection member and/or the at least one separate light deflection member, the imaging system may be adaptable to different imaging and/or lighting applications. For example, the wavelength-selectivity may be implemented by an electronically controllable dichroitic mirror.

In some embodiments, a deflection angle and/or the wavelength-selectivity of the at least one imaging deflection member and the at least one separate light deflection member are configured to be adjustable independently from each other.

Due to an independent adjustment of the deflection angle and/or the wavelength-selectivity of the at least one imaging deflection member and the at least one separate light deflection member, imaging and lighting options may be independently selected and controlled.

According to some embodiments, the deflection unit provides spatially separated ducts for the at least one imaging deflection member and/or the at least one separate light deflection member.

Consequently, the ducts spatially separate the optical path of the imaging device from the at least one light source to avoid interferences of the light as such and/or stray light with the optical path of the imaging device. In other words, the optical path of the imaging device guided through an imaging duct with the imaging deflection member incorporated therein is isolated from the light emitted from the at least one light source.

Another aspect of the present invention relates to a method for calibrating a medical imaging system. The method comprises the steps of:

defining a region of interest as initial tool center point,
positioning an imaging focus of an imaging unit in a first position corresponding to the region of interest,
recording a first image in the first position by the imaging unit,
rotating the imaging unit around the region of interest in a second position with the region of interest defining the center of rotation,
recording a second image in the second position by the imaging unit,
comparing the first and second image to identify a deviation, and
setting the initial tool center point as calibrated tool center point, when the identified deviation is below a predetermined threshold, or recalculating a calibrated tool center point based on the identified deviation, when the identified deviation is equal to or above a predetermined threshold.

With respect to the deflection unit as described before, the releasable attachment may, for example, provide some positioning tolerances when being attached to the imaging unit. Alternatively or in addition, the use of different deflection units with respective tolerances may also cause deviations in a respective deflection angle. In particular, the deflection unit may be provided as an injection molded housing with the imaging deflection member or the imaging deflection member and at least one separate light deflection member mounted therein, each component and assembling being prone to deviations. Accordingly, the factory setting of a tool center point with respect to the imaging unit may not comply with a tool center point of the imaging system with the imaging unit combined with the deflection unit or after a respective change of the deflection unit. Irrespective of the use of an imaging system with or without a deflection unit attached to an imaging unit, the mechanism to move the imaging unit, like a robotic arm of a medical robotic microscope, may also comprise some tolerances and therefore deviations that may require a further calibration of the imaging system with respect to initial factory settings of the imaging unit.

Accordingly, the method for calibrating a medical imaging system may be applied to an imaging system as described before when the deflection unit is attached to the imaging unit. A region of interest, like a test pattern, is defined as initial tool center point and an imaging focus of an imaging unit is positioned in a first position corresponding to the region of interest. In other words, the imaging focus is positioned in the first position to image the region of interest and therefore the tool center point accordingly. The first image unit records an image of the region of interest in the first position. If the initial tool center point corresponds to a valid tool center point of the imaging system, rotating the imaging unit around the tool center point along a circular path towards a second position should result in a second image in the second position corresponding to the first image. Such correspondence relates to the overlap of the first and second image without a shift of image characteristics in terms of spatial deviations. Therefore, the first and second images are compared with each other. For example, an image processing unit automatically compares the first and second image. Such image processing unit may also be configured to disregard deviations that arise from different viewing angles. In other words, the first and second image should provide the same image portion or field of view, respectively.

Some minor deviations may be acceptable, e.g. not detectable by the naked eye. However, if a deviation is equal or above a predetermined threshold, the region of interest may not be further recorded in the second position. Thus, a calibrated tool center point is recalculated in such event based on the determined deviation.

In some embodiments, the calibrated tool center point is set as tool center point for the imaging system or the imaging system is adjusted such that the initial tool center point complies with the calibrated tool center point.

The calibrated tool center point may therefore replace the initial tool center point or being set as final tool center point. Alternatively, a respective control device may also be configured to move the imaging unit in accordance with a compensation of the difference between the initial tool center point and the calibrated tool center point. In such event, the initial tool center point is still considered at tool center point but the control unit calculates a correction movement for the imaging unit in each rotational movement around the tool center point to compensate for the deviation between the initial tool center point and the calibrated tool center point. Alternatively or in addition to a correction movement, the imaging focus may be corrected accordingly by a respective focusing unit and/or the imaging deflection member. The same may apply to the at least on light source.

According to some embodiments, the region of interest comprises at least one predetermined artefact to identify a deviation when comparing the first image with the second image.

For example, a region of interest may comprise a QR-code as predetermined artefact. Accordingly, only the QR-code in the first image and in the second image is compared with each other in order to identify a deviation. Consequently, the amount of data to be analyzed by such comparison can be reduced.

Further advantages, aspects and details of the disclosure are subject to the claims, the following description of preferred embodiments applying the principles of the dis-

BRIEF DESCRIPTION OF THE SEVERAL VIEWS OF THE DRAWINGS

FIG. 3 is a schematic side view of the exemplary deflection unit according to FIG. 2;

FIG. 4A is a schematic representation of an imaging unit of the imaging system according to FIG. 1 in a first position and in a second position according to an exemplary embodiment of a method for calibrating a medical imaging system with an initial tool center point corresponding to a calibrated tool center point; and FIG. 4B is a schematic representation of an imaging unit of the imaging system according to FIG. 1 in the first position and in the second position according to the exemplary embodiment of a method for calibrating a medical imaging system with the initial tool center point deviating from a calibrated tool center point.

DESCRIPTION OF SPECIFIC EMBODIMENTS OF THE INVENTION

Figure 1:
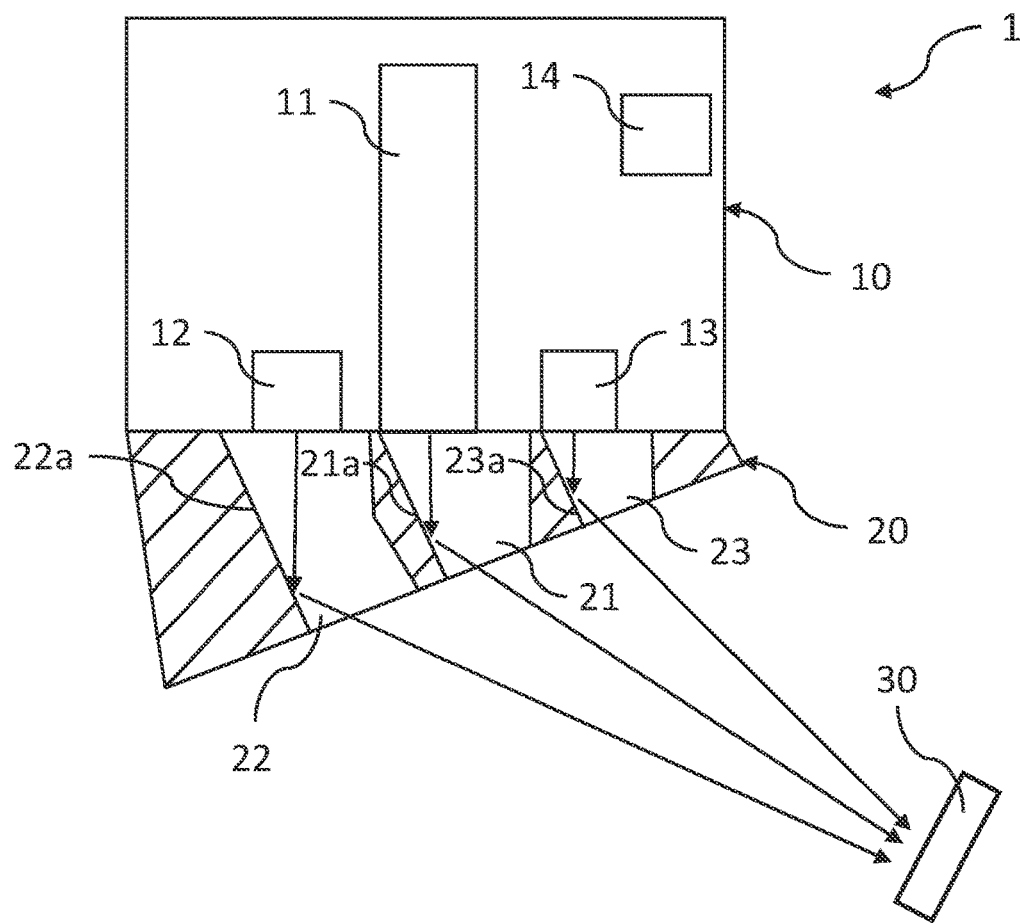
FIG. 1 is a schematic cross-sectional view of an imaging system according to an exemplary embodiment.

FIG. 1 shows a schematic cross-sectional view of an imaging system 1 according to an exemplary embodiment. The imaging system 1 comprises an imaging unit 10 and a deflection unit 20 releasable attachable to the imaging unit 10. The imaging unit 10 comprises an imaging device 11, a first light source 12 and a second light source 13. The inlet of the imaging device 11 for receiving an image is arranged on an imaging side of the imaging unit 10. The outlets of the first light source 12 and the second light source 13 to emit light are also arranged on the imaging side of the imaging unit 10. In FIG. 1, the optical path of the imaging device 11 and the light paths emitted by the first light source 12 and the second light source 13 extend from the imaging side of the imaging unit 10 perpendicular to the imaging side in a direction away from the imaging unit 10 as indicated by the solid arrows. Further, the imaging unit 10 incorporates a control unit 14. In alternative embodiments, the control unit may be incorporated in the deflection unit or an external control device. The control unit 14 is configured to independently control the emitting angle of the light of the first light source 12 and second light source 13 as well as the receiving angle of the optical path for receiving an image of the imaging device 11. In alternative embodiments, the control unit 14 may only control one of the respective angles or a specific combination thereof. The control of the respective angles allow an adjustment of a deflection by the deflection unit 20, as described later.

The deflection unit 20 comprises an imaging duct 21 with an imaging deflection member 21a, a first light duct 22 with a first light deflection member 22a, and a second light duct 23 with a second light deflection member 23a. The ducts 21, 22, 23 are spatially separated from each other to isolate the optical path of the imaging device 11, the light emitted from the first light source 12 and the light emitted from the second light source 13 from each other. In other words, the deflection unit 20 provides three separated channels each extending spatially separated through the deflection unit 20. Further, the deflection unit 20 is configured such that each opening of a respective duct 21, 22, 23 on an attachment side of the deflection unit 20 facing the imaging side of the imaging unit 10 complies with the inlet of the optical path of the imaging device 11 and the outlet of the light emitted from the first light source 12 and second light source 13, respectively. Specifically, the opening of the first light duct 22 on the attachment side of the deflection unit 20 surrounds the emitting area of the first light source 12, the respective opening of the imaging duct 21 surrounds the optical path to be received by the imaging device 11, and the respective opening of the second light duct 23 surrounds the emitting area of the second light source 13. Further, a side of the deflection unit 20 opposed to the attachment side of the deflection unit 20 is inclined with respect to the attachment side forming an inclination angle between the attachment side and the opposed side of the deflection unit 20. Accordingly, each side of each duct 21, 22, 23 with a maximum distance to the origin of the inclination angle is longer than each side of each duct 21, 22, 23 with a minimum distance to the origin of the inclination angle. The deflection members 21a, 22a, 23a are arranged on such longer side of the respective ducts 21, 22, 23 to allow the optical path of the imaging device 11 and the light of the first light source 12 and the second light source 13 to be deflected without obstructed by the respectively opposed shorter side. According to the exemplary embodiment, each of the deflection members 21a, 22a, 23a is a plane parallel deflection mirror. With the light emitted by the first light source 12 and the light emitted by the second light source 13 being parallel to the optical path of an image to be received by the imaging device 11, the inclination angles of the deflection members 21a, 22a, 23a differ from each other and are configured to deflect all paths on the same region of an object 30. The different inclination angles are provided by different inclination of portions of the respective ducts 21, 22, 23 for receiving the plane parallel deflection members. In other embodiments, the different inclination angles may be provided by the deflection members itself, e.g. by deflection mirrors deviating from a plane parallel configuration.

For adjusting or changing a deflection angle, the control device 14 is configured to adapt the emitting angle of the first light source 12 and/or the second light source and/or the optical path to be received by the imaging device 11 by tilting the first light source 12, the second light source 13 and/or the imaging device 11 and/or an optical component thereof. In alternative embodiments, the deflection members may be controlled to provide an adjustable deflection angle, e.g. by controlling a drive of the respective deflection members 21a, 22a, 23a to tilt the deflection members 21a, 22a, 23a to provide a predetermined deflection angle.

Figure 2:
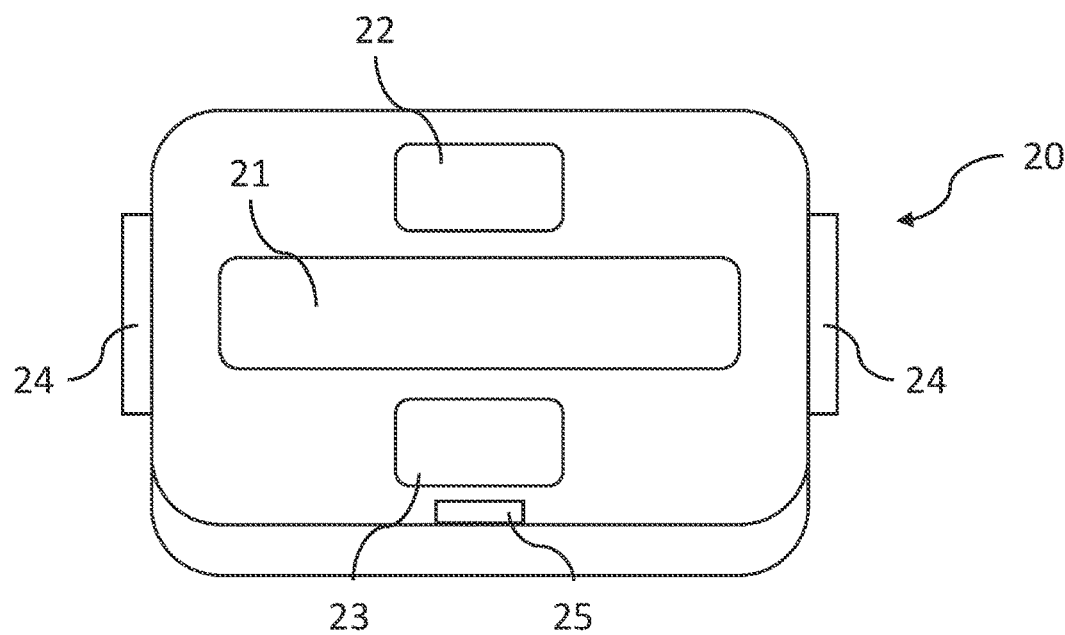
FIG. 2 is a schematic perspective top view of an exemplary deflection unit applicable to the exemplary embodiment of the imaging system according to FIG. 1.

FIG. 2 shows a schematic perspective top view of the deflection unit 20 attachable to the imaging unit 10 of the imaging system 1 according to FIG. 1. Next to the imaging duct 21, the first light duct 22 and the second light duct 23, the deflection unit 20 comprises two attachment members 24 and a locking member 25. The attachment members 24 are arranged on opposing lateral sides of the deflection unit 20 with respect to the attachment surface of the deflection unit 20. The locking member 25 is arranged on the attachment surface adjacent to a lateral side different from the lateral sides providing the attachment members 24. Due to the spatial separation of the attachment members 24 and the locking member 25 an accessibility of each of the members 24, 25 not obstructed by the other member 24, 25 and any ambiguity error may be avoided. The attachment members 24 are configured to releasably attach the deflection unit 20 to the image unit 10 while the locking member 25 locks the deflection unit 20 to the imaging unit 10 against an unintended detachment. According to the exemplary embodiment, the locking member 25 is further configured to form a hinged joint to allow the deflection unit 20 to be moved out of the optical path and the light paths while still being affixed to the imaging unit 10.

According to the specific configuration of the attachment members 24 and the locking member 25, FIG. 3 shows a schematic side view of the exemplary deflection unit 20 of FIG. 2. The attachment members 24 are configured as snap-fit attachment members. Each attachment member 24 provides a resilient arm extending from the lateral side of the deflection unit in a direction to the imaging unit 10 or in a direction perpendicular to the plane defined by the attachment surface, respectively. A free end of each of the attachment members 24 comprises a least one snap-fit member (not shown in this perspective), e.g. a hook or protrusion protruding inwardly from the resilient arm. In turn, the imaging unit 10 provides corresponding recesses to receive the snap-fit members. To further secure the deflection unit 20 to the imaging unit 10 of the locking member 25, the locking member 25 extends perpendicular from the attachment surface of the deflection member 20. A free end of the locking member is configured as eyelet to be locked to the imaging unit 10 by a splint pin passing through the eyelet of the locking member and a corresponding eyelet of the imaging unit 10.

Further, FIG. 3 shows an exemplary cover 40 releasably attached to the deflection unit 20. Here, the cover 40 is a sterile cover with two opposed cover attachment members 41. Similarly to the attachment members 24, the cover attachment members 41 are configured as snap-fit attachment members to engage with corresponding recesses of the deflection unit 20.

According to the exemplary embodiment of the imaging system 1, a tool center point is associated with the imaging unit 10. The tool center point is a reference point for a controlled movement of the imaging unit 10, e.g. by a robotic arm. Consequently, an imaging focus of the imaging unit 10 should comply with a predetermined position with respect to such tool center point according to a predetermined movement. The tool center point may be set as a factory setting for the imaging unit 10 or the imaging system 1, respectively. However, as components of the imaging system 1, like optical elements or drives, may be subject to changes, e.g. due to environmental boundary conditions, replacements or the like, at least some positions of the imaging focus of the imaging unit 10 may differ from target positions with respect the pre-set tool center point as reference point. In other words, the actual tool center point may be shifted with respect to the pre-set tool center point or initial tool center point, respectively. Specifically, the tool center point may be subject to such change when the deflection unit 10 is attached to the imaging unit 10 due to tolerances with regard to the attachment position, the positioning and inclination angle of the deflection members 21a, 22a, 23a and/or the deflection members 21a, 22a, 23a as such. To reflect the change of the tool center point, the present invention is also directed to a method for calibrating a medical imaging system. Even though the method is described with reference to the exemplary imaging system 1, the method is also applicable for other medical imaging systems or imaging units subject to a calibration requirement.

FIG. 4A is a schematic representation of the imaging unit 10 of the imaging system 1 according to FIG. 1 in a first position and in a second position according to an exemplary embodiment of a method for calibrating a medical imaging system with an initial tool center point corresponding to a calibrated tool center point. FIG. 4A shows the imaging unit 10 and a respective optical path of the imaging device 11. For reasons of clarity, the light emitted from the first light source 12 and the second light source 13 are not shown in the illustration. The first position of the imaging unit 10 is indicated by solid lines while the second position is indicated by dotted lines.

The imaging unit 10 is moved to a first position with an imaging focus of the imaging unit 10 being directed to a region of interest ROI defining an initial tool center point. Accordingly, the region of interest ROI is set as reference in correspondence with a pre-set tool center point. The region of interest ROI comprises a QR-code as predetermined imaging artefact. The imaging unit 10 records a first image of the region of interest ROI comprising the QR-code in the first position by the imaging device 11. Subsequently, the imaging unit 10 is rotated around the region of interest ROI along a circumferential path into a second position. Thus, the region of interest ROI defines a center of rotation for the circumferential movement of the imaging unit 10 in the second position with a constant distance between imaging unit 10 and the region of interest ROI with respect to the first position. The imaging device 11 of the imaging unit 10 records a second picture in the second position. The first image and second image are compared by an image processing unit to identify a deviation between the first image and the second image based on a potential deviation between the initial tool center point and an actual tool center point. The image processing unit in the exemplary embodiment is incorporated in the control unit 14 of the imaging unit 10. Since the movement of the imaging unit 10 from the first position to the second position provides different viewing angles, the image processing unit is configured to consider the different viewing angles when comparing the first image and the second image. Preferably, in order to reduce the amount of data to be compared by the image processing unit, the image processing unit is configured to compare any deviations in the QR-code as an example of an imaging artefact with respect to a change of a position within the first image and the second image. The different viewing angles are thereby compensated by the image processing unit to exclude a respective influence on the comparison. Further, a predetermined threshold is set in the control unit 14 that corresponds to a deviation requiring an adaption of the tool center point.

According to FIG. 4A the imaging focus of the imaging unit 10 in the second position corresponds to the imaging focus of the imaging unit 10 in the first position. Consequently, there is no deviation between the image artefact with respect to a positional change within the second image with reference to the first image. The identified (missing) deviation is therefore below the predetermined threshold. Accordingly, the control unit 14 sets the initial tool center point as calibrated tool center point. The calibrated tool center point is applied as reference point for subsequent movements and/or reorientations of the imaging unit 10 or the imaging device 11, respectively.

FIG. 4B is a further schematic representation of the imaging unit 10 of the imaging system 1 according to FIG. 1 in the first position and in the second position according to the exemplary embodiment of the method for calibrating a medical imaging system with the initial tool center point deviating from a calibrated tool center point.

As apparent from FIG. 4B, the optical path of the imaging device 11 of the imaging unit 10 slightly deviates from a perpendicular orientation with respect to the imaging side. Consequently, the first position of the imaging unit 10 to image the region of interest ROI in FIG. 4B differs from the first position of the imaging unit 10 to image the region of interest ROI in FIG. 4A. Due to the difference or the misalignment of the optical path as per FIG. 4B, the position of the imaging focus in the second position differs from the position of the imaging focus in the first position. The difference is detected by the comparison between the first image recorded by the imaging unit 10 in the first position and the second image recorded by the imaging unit 10 in the second position by the image processing unit. The deviation of the imaging focus corresponds to the deviation of the image artefact in the second image with respect to the first image. FIG. 4B represents a deviation above the predetermined threshold for setting a new tool center point. Therefore, the control unit 14 recalculates a calibrated tool center point different from the initial tool center point based on the identified deviation. The calibrated tool center point is applied as new reference point for subsequent movements and/or reorientations of the imaging unit 10 or the imaging device 11, respectively.

In alternative embodiments of the method for calibrating a medical imaging system, the medical imaging system is adjusted such that the initial tool center point complies with the calibrated tool center point. In other words, the initial tool center point is still set as reference point, while the recalculated calibrated tool center point is applied to control a correction movement of the imaging system with respect to the initial tool center point. In particular, if a misalignment requires only correction in some areas of movement, the tool center point has not to be adjusted as such but may only require a compensation of the moving path in such areas.

It is to be noted that the given examples are specific embodiments and not intended to restrict the scope of protection given in the claims. In particular, single features of one embodiment may be combined with another embodiment. For example, the method for calibrating a medical imaging device is not restricted to a medical imaging device comprising a deflection unit but may also be applied for other imaging systems.

LIST OF REFERENCE SIGNS 1 medical imaging system
10 imaging unit
11 imaging device
12 first light source
13 second light source
14 control device
20 deflection unit
21 imaging duct
21a imaging deflection member
22 first light duct
22a first light deflection member
23 second light duct
23a second light deflection member
24 attachment member
25 locking member
30 object
40 cover
41 cover attachment member
ROI region of interest

What is claimed is:

1. A robotic medical microscope for imaging an object, comprising:
   an imaging unit comprising at least one imaging device and
   a deflection unit comprising at least one imaging deflection member,
   wherein the imaging unit is movably supported by a robotic arm,
   wherein the at least one imaging deflection member is configured to be selectively disposed in an optical path of the imaging device to selectively deflect an imaging beam such that the imaging device provides an inclined or horizontal viewing angle while the imaging unit remains in a substantially upright position without being inclined with respect to a vertical position;
   wherein the deflection unit provides spatially enclosed separated ducts for comprising the at least one imaging deflection member.

2. The robotic medical microscope according to claim 1, wherein the deflection unit is at least partially releasably attachable to an imaging side of the imaging unit.

3. The robotic medical microscope according to claim 2, wherein the deflection unit comprises at least one attachment member, preferably configured as a snap-fit member, attachable to a corresponding receiving portion of the imaging unit.

4. The robotic medical microscope according to claim 1, wherein the deflection unit comprises at least one locking member to lock a connection of the deflection unit and the imaging unit.

5. The robotic medical microscope according to claim 1, wherein the robotic medical microscope further comprises a cover releasably attachable to a side of the deflection unit to be opposed to the imaging side of the imaging unit.

6. The robotic medical microscope according to claim 1, wherein the robotic medical microscope further comprises at least one light source (12, 13) separate from the imaging device, and wherein a light emitted from the at least one light source is deflectable by the at least one imaging deflection member and/or at least one separate light deflection member (22*a*, 23*a*) of the deflection unit.

7. The robotic medical microscope according to claim 6, wherein the robotic medical microscope further comprises a control unit to adjust a deflection angle of the at least one separate light deflection member (22*a*, 23*a*).

8. The deflection unit for a robotic medical microscope according to claim 6, wherein the at least one separate light deflection member (22*a*, 23*a*) is a deflection mirror or a deflection prism.

9. The deflection unit according to claim 8, wherein the at least one separate light deflection member (22*a*, 23*a*) is a wavelength-selective deflection member.

10. The deflection unit according to claim 8, wherein a deflection angle and/or the wavelength-selectivity of the at least one separate light deflection member (22*a*, 23*a*) are/is configured to be adjustable.

11. The deflection unit according to claim 8, wherein the deflection unit provides spatially separated ducts (21, 22, 23) for the at least one separate light deflection member (22*a*, 23*a*).

12. The robotic medical microscope according to claim 1, wherein the robotic medical microscope further comprises a control unit to adjust a deflection angle of the at least one imaging deflection member (21*a*.

13. A deflection unit for a robotic medical microscope according to claim 1, wherein the at least one imaging deflection member is a deflection mirror or a deflection prism.

14. The deflection unit according to claim 13, wherein the at least one imaging deflection member is a wavelength-selective deflection member.

15. The deflection unit according to claim 13, wherein a deflection angle and/or the wavelength-selectivity of the at least one imaging deflection member are/is configured to be adjustable.

16. The deflection unit according to claim 15, wherein the robotic medical microscope further comprises at least one light source (12, 13) separate from the imaging device, and wherein a light emitted from the at least one light source is deflectable by the at least one imaging deflection member and/or at least one separate light deflection member (22a, 23a) of the deflection unit, wherein the at least one separate light deflection member (22a, 23a) is a deflection mirror or a deflection prism, wherein the at least one separate light deflection member (22a, 23a) is a wavelength-selective deflection member, wherein a deflection angle and/or the wavelength-selectivity of the at least one separate light deflection member (22a, 23a) are/is configured to be adjustable, and wherein a deflection angle and/or the wavelength-selectivity of the at least one imaging deflection member and the at least one separate light deflection member (22a, 23a) are configured to be adjustable independently from each other.

* * * * *